United States Patent [19]
Maurer et al.

[11] Patent Number: 4,785,913
[45] Date of Patent: Nov. 22, 1988

[54] SPINDLE LUBRICATING SYSTEM

[75] Inventors: T. J. Maurer, Grosse Pointe; Patrick L. Jeakle, Washington; Clifford Willner, New Baltimore; James Goodsmith, Rochester, all of Mich.

[73] Assignee: Orsco Incorporated, Madison Heights, Mich.

[21] Appl. No.: 941,747

[22] Filed: Nov. 19, 1986

[51] Int. Cl.$^4$ .............................................. F01M 1/00
[52] U.S. Cl. .................................................. 184/6.26
[58] Field of Search ................... 184/6.14, 6.26, 55.2, 184/39.1; 239/290, 424

[56] References Cited

U.S. PATENT DOCUMENTS

| | | | |
|---|---|---|---|
| 3,939,944 | 2/1976 | Mitchell et al. | 184/6.26 |
| 3,955,647 | 5/1976 | Tine et al. | 184/39.1 |
| 4,520,848 | 6/1985 | Lucian et al. | 184/6.26 X |
| 4,520,902 | 6/1985 | Snow | 184/6.1 X |

FOREIGN PATENT DOCUMENTS

| | | | |
|---|---|---|---|
| 2540146 | 5/1976 | Fed. Rep. of Germany | 184/6.26 |
| 2542036 | 3/1977 | Fed. Rep. of Germany | 184/55.2 |
| 1247241 | 9/1971 | United Kingdom | 184/6.14 |

OTHER PUBLICATIONS

L50M2 Multi-Port Injection Lubricator, Watts.
Trabon Centralized Lubricating Systems, Lubriquip-Houdaille, Cleveland, Ohio.
Spindl-Gard Systems Components, Lubriquip-Houdaille, Cleveland, Ohio, 1985.
Bulletin No. LIBT-1, Red Lion Controls, York, Pa. May 1986.

*Primary Examiner*—Leonard E. Smith
*Attorney, Agent, or Firm*—Lloyd M. Forster

[57] ABSTRACT

Lubrication systems for high speed spindles characterized by precision cyclical fractional drop injection of liquid lubricant into nozzle directed toward bearings with continuous regulated pressure air stream to deliver accurate quantity of atomized lubricant mist over substantial period of time following each injection.

14 Claims, 1 Drawing Sheet

SPINDLE LUBRICATING SYSTEM

BACKGROUND OF THE INVENTION

Character of lubrication is critical for extending spindle speeds to progressively higher and higher r.p.m. without overheating and the consequent bearing failure, thereby accomodating progressively increased cutting speeds for machining operations made possible by technological improvements in cutting tools. Such increased spindle speeds are particularly important in high volume machining operations for automotive production parts and the like, where any reduction in cycle time through increased machining speeds can result in corresponding savings in manufacturing costs.

Typical spindle bearings involve two pairs of axially spaced ball or tapered roller thrust bearings where effective lubrication is essential. Conventional lubrication may involve packing the bearings with grease serviced periodically as through Alemite fittings. R.P.M. limitations arise when the grease overheats, oxidizes, and loses its lubricating properties.

Gravity fed and injector oil lubrication systems have been employed in order to achieve spindle speeds greater than with grease lubrication. It has been found in such systems that excess oil is a detriment and that minimization of accurately controlled sufficient lubrication offers the greatest potential for maximizing spindle speeds. Injectors capable of small quantity feed in the order of 0.004–0.005 cubic inch per stroke have been employed with air entrainment at the outlet of the injector for delivery through variable length tubing to nozzle outlets at the spindle bearings; such systems do not employ a pressurized oil capillary tube for delivery to the nozzle.

Prior art systems currently in use for spindle bearings include the "Trabon Spindleguard" system and "Bijur Systems" which deliver periodic injection of lubrication through a tube with 0.004–0.005 cubic inches per injection, (0.066–0.082 milliliters) as well as an Alemite system for delivering a continuous mist of lubricant. Maximum spindle speeds up to 600,000 dn (bearing diameter in millimeters times r.p.m.) have been obtained by such lubricating systems believed to be limited by uncertainty of precise control of the quantity and timing of lubrication. Prior art in lubricating cylinder walls in engine assembly plants includes injection through pressurized capillary tubing of 0.080 milliliters per rapid cycle stroke for five seconds with unregulated air pressure in the order of 80 p.s.i. delivered to the nozzle through a tube having approximately 1/10 inch ID for the five second injection cycle.

SUMMARY OF THE INVENTION

Applicants have found that in order to satisfy the requirement for long intervals between fractional drop injections, an electronic control of the injectors is required to accurately space the frequency of injections and dwell period before piston return. This has permitted an increase from 30 seconds maximum with a typical air-logic timer to a substantially unlimited time span, e.g. from 2 to 300 seconds.

A second critical feature of the present invention requires the combination of a check valve at each end of an oil filled pressurized capillary tube extending between the injector and the nozzle for delivery to the spindle bearings coupled with a continuous air supply into the nozzle at the downstream check valve. Spring loading of both check valves assures retention of a pressurized column of oil in the capillary tube with instantaneous delivery past the second check valve upon every injection stroke regardless of tube length and interruptions in system usage. The fractional drop of oil of each injection coats the ball, spring, thread, and cavity of the nozzle; and the continuous air stream admitted at the downstream ball scours the deposited oil from such elements with surprising uniformity of mist delivery through the nozzle over a substantial period of time, rather than as a short spurt of oil with each injection as in prior systems where air and oil delivery are simultaneously actuated over substantially equal, relatively instantaneous injection time periods.

DETAILED DESCRIPTION OF PREFERRED METHOD

Figure 2:
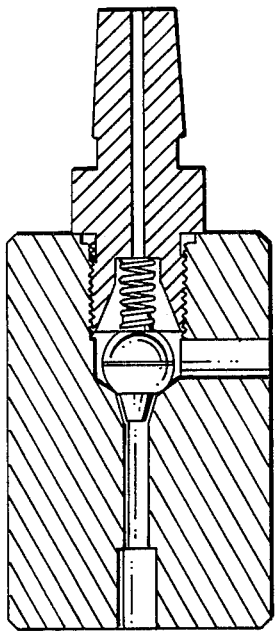
FIG. 2 is an enlarged sectional view illustrating the internal construction of the "V REL." valve of the FIG. 1 illustration.
Figure 1:
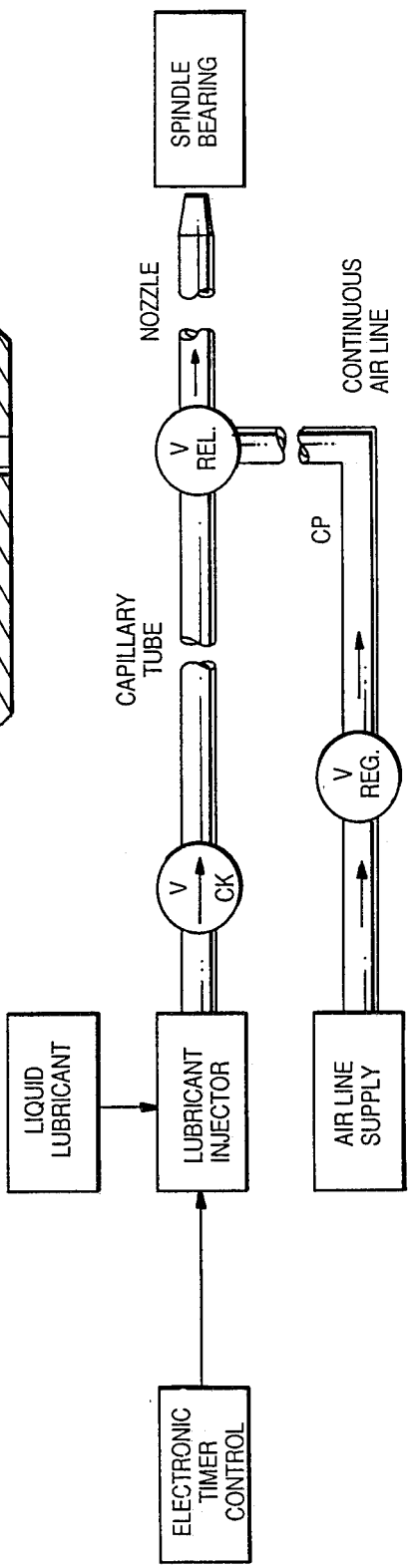
FIG. 1 illustrates schematically, in a diagrammatic view, the conventional elements employed in practicing applicants's method.

Applicants' lubrication system in test applications to date has made possible remarkable spindle speeds in excess of 1,000,000 dn, as applied to a 75 millimeter spindle previously limited to 600,000 dn, without exceeding an ambiant bearing temperature of 95° F. Such speed was reached at the limit of drive speed available with promise for even higher practical spindle speeds. With reference to the drawings, results to date can be accomplished with a commercial "Red Lion" Libra series, Model No. Libra 2000 electronic timer set to cycle once every 230 seconds, with a dwell of ½ second before retraction, adapted to fire a Watts KL50M Injector for each of two pairs of spindle bearings with 80 p.s.i. line pressure, and a 20 to 1 actuating piston-to-injector area having a maximum displacement in the order of 0.040 milliliters set to deliver 0.025 milliliters (approximately ½ drop) per injection through a 60 p.s.i. check valve to a capillary tube having a ⅛ inch OD and 1/16 inch ID delivering to a nozzle at the bearing location through a 60 p.s.i. check valve with continuous air from a line pressure of up to 100 p.s.i. set at a regulated pressure within a range of 15 to 50 p.s.i., or specifically of 35 p.s.i., delivered to the nozzle inlet at the outlet side of the check valve seat through an air tube having a 1/16 inch diameter inlet passage at the nozzle. A dual outlet delivered in opposite directions to the pair of bearings at each bearing location of the spindle with outlet orifices having an area in the range of 0.0003 to 0.0125 square inches, or specifically of 0.040 inches diameter. Equal exhaust passages were provided for permitting escape of the continuous air supplied to the bearings.

Optimum results can be obtained by delivering a precise minimum required quantity of oil continuously in an atomized air mist at a substantially uniform rate. Applicants' system can most nearly provide such optimum results by delivering a minimum required precise quantity of oil with minimum injector displacement and maximum frequency of injection combined with continuous air under pressure adjusted to provide the most uniform possible rate for scouring each injection of oil from the nozzle over the maximum period of time following each injection. The second check valve at the nozzle location maintains a pressurized column of oil in the capillary tube ready for instantaneous resumption of delivery following every interruption in system usage thereby solving problems of irregularities in start up delivery encountered in the absence if said check valve.

In an automatic lubricating system, for a continuously operating high speed spindle it is important to filter the air supply and monitor both oil and air supply in order to protect the bearing against damage from any failure to lubricate. This may be accomplished by providing a low air pressure, a low oil pressure, and low oil level signal lights for both front and rear bearings with appropriate pressure sensing devices including means for automatic shut-off of spindle power whenever predetermined minimum values are detected.

OTHER APPLICATIONS FOR THE SYSTEM

While applicant system was particularly developed to meet the requirement for increasing maximum spindle speeds, the system is applicable to numerous other lubricating requirements wherever precise limited quantities of lubricant can be applied in an air entrained mist. Special nozzles may be employed to direct such mist wherever the lubricant is needed, e.g. an annular nozzle delivering in a 360° lateral direction may be employed in depositing a fine mist of lubricant on a cylinder wall preparatory to assembling pistons in an engine assembly plant; a continuous fine mist of lubricant may be applied to a conveyor chain as it passes a lubricating station; in fact supplying continuous air with precisely controlled intermittent oil injection may be used to provide continuous lubrication for any assembly, machining, or other operation requiring surface lubrication. In essence, applicants have discovered that by employing check valves at both ends of a capillary tube, continuous air plus intermittent oil injection can be adapted to provide precise continuous lubrication with a minimum of lubricant required to meet the need; and to stand ready for instantaneous resumption upon start up after each interruption in system use.

I claim:

1. Lubricating system comprising the method steps of cyclically positively displacing accurate liquid lubricant injections through a pressure resisting check valve into a pressurized oil filled delivery tube passage leading through a second pressure resisting check valve at a nozzle directed toward a lubrication target, and continuously supplying air under regulated pressure at less than line pressure at the outlet of said second valve to atomize, entrain, and scour each injection of lubricant from surfaces at second said check valve and nozzle in order to deliver an accurate quantity of atomized lubricant mist over a substantial period of time following each injection of lubricant into the nozzle.

2. Lubrication system of claim 1 including accurately adjusting the injection cycle frequency with an electronic control.

3. Lubrication system of claim 1 including accurately adjusting the injection cycle frequency with an electronic control within a range of 2 to 300 seconds.

4. Lubrication system of claim 3 with an injection frequency adjusted to approximately 4 minutes.

5. Lubrication system of claim 1 including injections made by an adjustable positive displacement piston.

6. Lubrication system of claim 1 including injections made by an adjustable positive displacement piston having a maximum displacement in the order of 0.040 milliliters.

7. Lubrication system of claim 1 including second check valve resistance in the order of 60 p.s.i..

8. Lubrication system of claim 1 including delivery into a capillary tube passage in the order of 1/16 inch ID.

9. Lubrication system of claim 1 including air delivered at a regulated pressure less than line pressure of up to 100 p.s.i.

10. Lubrication system of claim 9 including air delivered at a regulated pressure within a range of 15 to 50 p.s.i.

11. Lubrication system of claim 10 including air delivered at a regulated pressure in the order of 35 p.s.i.

12. Lubrication system of claim 1 including delivery through a nozzle outlet with an area in the range of 0.0003–0.0125 square inches.

13. Lubrication system of claim 12 including delivery through a nozzle outlet with a circular diameter in the order of 0.040 inches.

14. Lubrication system of any of claims 1–13 comprising a method for lubricating spindle bearings.

* * * * *